United States Patent
Tang et al.

(10) Patent No.: US 9,083,429 B2
(45) Date of Patent: Jul. 14, 2015

(54) HIGHLY INTEGRATED VERY SMALL APERTURE TERMINAL (VSAT) APPARATUS AND METHOD

(71) Applicant: VT IDIRECT, INC., Herndon, VA (US)

(72) Inventors: Hai Q. Tang, Olney, MD (US); Theodore A. Schweitzer, Fairfax, VA (US); Matthew A. Reklau, Herndon, VA (US); Christopher D. Gregory, Potomac Falls, VA (US)

(73) Assignee: VT IDIRECT, INC., Herndon, VA (US)

( * ) Notice: Subject to any disclaimer, the term of this patent is extended or adjusted under 35 U.S.C. 154(b) by 221 days.

(21) Appl. No.: 13/738,584

(22) Filed: Jan. 10, 2013

(65) Prior Publication Data

US 2013/0128805 A1    May 23, 2013

Related U.S. Application Data

(62) Division of application No. 12/676,649, filed as application No. PCT/US2008/075594 on Sep. 8, 2008, now Pat. No. 8,379,563.

(60) Provisional application No. 60/970,392, filed on Sep. 6, 2007.

(51) Int. Cl.
*H04B 7/204* (2006.01)
*H01Q 3/00* (2006.01)
*H04B 7/185* (2006.01)
*G06F 1/26* (2006.01)
*H04L 12/28* (2006.01)

(52) U.S. Cl.
CPC ............... *H04B 7/204* (2013.01); *H01Q 3/005* (2013.01); *H04B 7/18519* (2013.01); *G06F 1/26* (2013.01); *H04L 2012/2843* (2013.01)

(58) Field of Classification Search
CPC ................... H04L 12/2872; H04L 2012/2843; G06F 1/26
See application file for complete search history.

(56) References Cited

U.S. PATENT DOCUMENTS

| | | | |
|---|---|---|---|
| 3,365,674 A | 1/1968 | Treu | |
| 6,122,261 A | 9/2000 | Fernandes et al. | |
| 6,366,620 B1 | 4/2002 | Jackson et al. | |
| 6,459,175 B1 * | 10/2002 | Potega | 307/149 |
| 6,607,394 B2 | 8/2003 | Lindberg et al. | |
| 6,996,389 B2 | 2/2006 | Fitzpatrick et al. | |
| 7,386,074 B1 | 6/2008 | Venkatesh et al. | |
| 8,036,788 B2 * | 10/2011 | Breed | 701/31.9 |
| 8,295,185 B2 * | 10/2012 | Binder | 370/245 |
| 2003/0080898 A1 * | 5/2003 | Wang et al. | 342/359 |

(Continued)

FOREIGN PATENT DOCUMENTS

| EP | 1 478 088 | 11/2004 |
|---|---|---|
| WO | WO 2007/071059 | 6/2007 |

*Primary Examiner* — Raj Jain
(74) *Attorney, Agent, or Firm* — Oblon, McClelland, Maier & Neustadt, L.L.P.

(57) ABSTRACT

A method, and a VSAT capable of being configured for such a method, of configuring a VSAT, the steps of which are setting, while an outdoor unit of the VSAT is at a configuration location, a maximum value of the adjustable gain of the up-converting device and transmitting, from an operating location that is separate from the configuration location, transmission signals to the satellite at the transmission frequency and with a gain value of at most the maximum value of the adjustable gain set at the configuration location.

4 Claims, 6 Drawing Sheets

(56) References Cited

U.S. PATENT DOCUMENTS

| | | |
|---|---|---|
| 2004/0033812 A1 | 2/2004 | Matsunaga et al. |
| 2004/0203528 A1 | 10/2004 | Ammar et al. |
| 2005/0094591 A1 | 5/2005 | Kwon |
| 2006/0116073 A1 * | 6/2006 | Richenstein et al. ........ 455/3.06 |

* cited by examiner

HIGHLY INTEGRATED VERY SMALL APERTURE TERMINAL (VSAT) APPARATUS AND METHOD

CROSS REFERENCE TO RELATED APPLICATIONS

This application is a divisional application of and claims the benefit of priority under 35 U.S.C. §120 from U.S. patent application Ser. No. 12/676,649, filed Jul. 19, 2010, which claims priority to U.S. Patent Application No. 60/970,392 filed on Sep. 6, 2007, the entire contents of which are incorporated herein by reference.

BACKGROUND OF THE INVENTION

1. Field of the Invention

The field of the invention relates to very small aperture terminals and systems for communicating with a satellite.

2. Discussion of the Background

VSATs are used for bi-directional satellite communication systems such as the system depicted FIG. 7. As to the transmit direction, FIG. 7 depicts a conventional VSAT having an ODU (outdoor unit) 18 and an IDU (indoor unit) 12 which generally includes a modem and power amplifier for transmitting and amplifying an L-band signal along transmission line 14.

In this conventional system, transmission line 14 connects to an up-converter 16 housed within an ODU 18, where the up-converter 16 up-converts the L-band signal to a microwave frequency signal and also amplifies the microwave frequency signal. In order for the up-converter 16 to up-convert the L-band signal to a specific microwave frequency, the IDU 12 may also transmit a reference frequency, usually at 10 MHz, along with the L-band signal to the up-converter 16.

The specific microwave frequency may be in the Ku-band, and this transmission is transmitted via waveguide 20, and a feed horn assembly and parabolic reflector (not shown), to a satellite 22. The satellite 22 then transmits or repeats the transmission signal to a hub 24 where the transmission signal is received and used for various purposes such as voice, internet or network access.

Generally, the transmission signal from the 18 to the satellite 22 operates according to a TDMA (Time Division Multiple Access) network protocol at a specific operating or transmission frequency of the ODU 18.

As to the receive direction, or data reception at the IDU 12, the hub 24 transmits a transmission signal via the satellite 22 back to the waveguide 20 where the transmission signal is converted by a low noise block converter 26. The low-noise block converter 26 converts the signal back into an L-band signal for transmission along the transmission line 28 back to the IDU 12.

The transmission lines 14 and 28 are usually a coaxial cable, such as industry standard RG-59/U or RG-6/U. The specific type of transmission line is chosen based upon various transmission requirements such as power, frequency, distance and voltage.

The computer terminal 30 may act as a data transmitter and receiver via a connection to the modem. The transmission signal generally includes data supplied by the computer terminal 30 or hub 24 (depending on whether it's an upstream or downstream transmission) transmitted along a carrier signal at a transmission frequency.

In order to configure the IDU 12 and the ODU 18 for proper transmission to the satellite 22, the IDU 12 and the ODU 18 may first be commissioned and calibrated. In commissioning and calibrating a conventional IDU 12 and ODU 18, both first need to be installed and fixedly secured at an operating location. Further, after the IDU 12 and ODU 18 are fixedly secured at the operating location, the transmission lines 14 and 28 are customized to be suitable for each different operating location. The customization may include cutting the transmission lines 14 and 28 to desired lengths suitable for the operating location and/or routing and fixedly securing the transmission lines in a manner suitable for the operating location.

In this conventional system, it is important to customize the transmission lines after securing the IDU 12 and ODU 18 because the electrical response of the IDU 12 and the ODU 18 depend on the transmission losses incurred along the transmission lines 14 and 28. Depending upon the operating location, transmission lines 14 and 28 may vary in length by hundreds of feet, where a substantial amount of transmission power may be lost. The transmission losses across transmission lines 14 and 28 are also affected by environmental noise and other electromagnetic wave generating devices such as wireless networks and cellular transmissions. Also of importance, any bends or kinks in the transmission lines 14 and 28 affect transmission losses. Accordingly, in this conventional system it is important to customize the transmission lines after securing the IDU 12 and ODU 18 to maximize the communication efficiency of the VSAT.

Once the IDU 12, ODU 18, and transmission lines 14 and 28 are fixedly secured, the power amplification of the IDU 12 can be configured. The power amplification is generally set so as to limit operation of the modem to a linear gain response. That is, operation of the modem is preferably set below a saturation level, where if gain is further increased, the modem may be damaged or the transmitted signal may be distorted. Additionally, in a gain range approaching saturation, also known as a non-linear response range, the output transmission power will stop increasing as gain is increased.

The linear gain response of the power amplification of the IDU 12 and up-converter 16, however, is frequency dependent. The transmission loss across transmission lines 14 and 28 is also frequency dependent. In order to test and monitor the transmission loss and the linear gain response in a conventional system, a test frequency may be used for communicating to the hub 24 via satellite 22. This test frequency may be several hundred megahertz away from an operating transmission frequency.

In the conventional system, the hub 24 will be in communication with a technician manually configuring IDU 12 so as to convey the necessary transmission details to ensure the maximum power amplification of the transmission signal by the IDU 12, and the transmission signal is received at the hub 24 with an adequate carrier to noise ratio. Namely, the hub 24 needs to receive a minimum threshold signal of a carrier to noise ratio (a requirement supplied by the hub 24) for proper transmission of the data by the transmission signal. The carrier to noise ratio of the transmission signal is frequency and power dependent.

Since there is a plurality of VSATs attempting to connect to hub 24 via satellite 22, the test frequency used by conventional VSATs for determining the transmission losses and the power requirements cannot be the same or near the normal operating transmission frequency of the other VSATs because the output characteristics of the IDU 12 and ODU 18 are yet to be determined. Thus, in the conventional system, if a signal is sent to the satellite with an incorrect polarization or incorrect carrier to noise ratio, the signal may disrupt other VSAT transmissions on the same network.

Thus, in the conventional VSAT, the test frequency serves may be used to estimate the characteristics of the IDU 12 and the ODU 18 operating at the actual transmission frequency. Once the characteristics have been determined by the hub 24, and the IDU 12 and the ODU 18 have been properly configured, the ODU 18 is set to operate at the transmission frequency.

However, in the conventional system as mentioned above, the power amplifier of the IDU 12 may not be calibrated at the most efficient level possible because a test frequency was used instead of the actual operating frequency of the ODU 18.

SUMMARY OF THE INVENTION

One aspect of the invention broadly comprises a method of transmitting a transmission signal from a very small aperture terminal (VSAT) by an antenna to a satellite, the transmission signal having a transmission frequency that is also used by a transmission signal from at least one other VSAT for communicating with the satellite, and the VSAT including an up-converting device configured to amplify a baseband signal according to an adjustable gain to produce the transmission signal at the transmission frequency. The method includes: setting, while the VSAT is at a configuration location, a maximum value of the adjustable gain of the up-converting device; and transmitting, from an operating location that is separate from the configuration location, transmission signals to the satellite at the transmission frequency and with a gain value of at most the maximum value of the adjustable gain set at the configuration location.

Additionally, the up-converting device can includes a substantially linear gain amplifying range and a non-linear gain amplifying range for the transmission frequency. The maximum value of the adjustable gain corresponds to an input gain value in the non-linear gain amplifying range where the up-converting device produces a transmission signal at the transmission frequency having an output power which is immediately preceding a saturation point of the up-converting device, and the saturation point corresponds to a saturated input gain which does not increase the output power relative an input gain which is less than the saturated input gain.

Further, the method can include transmitting the transmission signals from the VSAT and the at least one other VSAT to the satellite according to a time-division multiple access protocol.

Also, the step of setting can include setting the maximum value of the adjustable gain of the up-converting device using the transmission frequency.

Alternatively, the setting can include determining a plurality of maximum values of the adjustable gain of the up-converting device based on a plurality of transmission frequencies, and storing the plurality of maximum values on a computer readable medium in the VSAT.

Preferably, the VSAT, most preferably the ODU of the VSAT, can include a modem configured to produce the baseband signal and the modem is arranged within 1 m of the up-converting device. Alternatively, the modem and the up-converting device are fixedly secured within a rigid housing structure of the VSAT at a fixed distance from one another.

The method can further include a step of determining a power characterization of the up-converting device at the configuration location, wherein the power characterization reflects a frequency response of the up-converting device for a range of transmission frequencies for the VSAT, and the transmission frequency of the VSAT is within the range of transmission frequencies. Also, the method can further include determining an initial power setting of the up-converting device at the transmission location using the power characterization of the up-converting for the transmission frequency and a link budget of the VSAT. The link budget is a function of at least a receiver gain, a receiver loss and a carrier to noise ratio requirement of the satellite, an environmental loss at the operating location, and a transmission loss and a transmission gain of the VSAT. The step of transmitting can be performed with a gain value of at least the initial power setting.

The transmission frequency can be within at least one of an S, C, X, Ku and Ka band of frequency, or a frequency within a range of at least one of 5.65 to 6.85 GHz, 7.9 to 8.4 GHz, 13.75 to 14.50 GHz and 29.5 to 31.0 GHz In another embodiment, the invention broadly comprises an ODU of a VSAT for communicating with a satellite. This ODU includes modem configured to output a baseband signal, and an up-converting device configured to receive the baseband signal, convert the baseband signal to a transmission signal at a transmission frequency, and output the transmission signal to a satellite. Here, the modem and the up-converting device are fixedly secured within a rigid housing structure of the ODU at a fixed distance from one another. Preferably, this fixed distance is at most 1 m.

This power amplifier can be configured to amplify the transmission signal up to a maximum value of the adjustable gain of the power amplifier. The power amplifier can have a substantially linear gain amplifying range and a non-linear gain amplifying range for the transmission frequency, where the maximum value of the adjustable gain corresponds to an input gain value in the non-linear gain amplifying range where the power amplifier produces a transmission signal at the transmission frequency having an output power which is immediately preceding a saturation point of the power amplifier, and the saturation point corresponds to a saturated input gain which does not increase the output power relative an input gain which is less than the saturated input gain.

In yet another embodiment, the present invention broadly comprises a method of commissioning a very small aperture terminal (VSAT) for communicating with a satellite. The steps include configuring a modem to output a baseband signal to an up-converting device having an adjustable gain and calibrating the up-converting device. The step of calibrating includes setting the up-converting device to convert the baseband signal to a transmission signal having a transmission frequency, and amplify the transmission signal to at most a maximum value of the adjustable gain. The up-converting device has a substantially linear gain amplifying range and a non-linear gain amplifying range for the transmission frequency, and the maximum value of the adjustable gain corresponds to an input gain value in the non-linear gain amplifying range where the up-converting device produces a transmission signal at the transmission frequency having an output power which is immediately preceding a saturation point of the up-converting device, and the saturation point corresponds to a saturated input gain value which does not increase the output power relative an input gain which is less than the saturated input gain. This method further includes the step of determining a power characterization of the up-converting device at the configuration location, wherein the power characterization reflects the frequency response of the up-converting device for a range of transmission frequencies for the VSAT, and the transmission frequency of the VSAT is within the range of transmission frequencies. Additionally, this method includes the step of installing and fixing the VSAT terminal after the steps of configuring the modem, calibrating the up-converting device, and determining the power characterization of the up-converting device. Additionally, this method includes the step of determining an initial power setting of the up-converting device based upon the power characterization of the up-converting for the transmission frequency and a link budget of the VSAT. The link budget is a function of at least a receiver gain, a receiver loss and a carrier to noise ratio requirement of the satellite, an environmental loss at the operating location, and a transmission loss and a transmission gain of the VSAT. This method also includes a step of calibrating the polarization of the transmission signal.

The initial power setting is preferably at least 3 dB greater than satisfying the minimum carrier to noise ratio for reception of the transmission signal at the satellite, and is even more preferably at least 6 dB greater.

In yet a further embodiment, the invention broadly comprises a system for communicating with a satellite. The system includes an IDU, including an orthogonal frequency-division multiplexer configured to combine a DC power signal and a data signal into a bi-direction transmission signal, and output the transmission signal along a coaxial cable. The system also includes an ODU having electronic devices configured to receive the transmission signal via the coaxial cable, extract the data signal from the transmission signal, amplify the transmission signal, and transmit the extracted data signal to the satellite, wherein the electronic devices are energized using the DC power signal.

The electronic devices in the ODU can include a de-multiplexer configured to de-multiplex the transmission signal received via the coaxial cable to separate the extracted data signal from the DC power signal.

The DC power signal preferably has a voltage of at most 59 V and a power transmission of at most 100 Watts. Most preferably, the power transmission is at most 70 Watts.

The base station can be configured to condition the DC power signal along the coaxial cable for hot connect and hot disconnect, wherein hot is defined as a live DC power signal. Also, the base station can include circuitry for short circuit protection.

Still, in yet a further embodiment, the invention broadly comprises another system for communicating with a satellite. This system includes an IDU having a bi-directional data interface configured to transmit a first data signal along a first twisted pair of wires and receive a second data signal along a second twisted pair of wires. This system also includes a power sourcing device configured to output a DC power signal along both the first and second twisted pair of wires as well as a third and fourth twisted pair of wires. This system further includes a connection interface configured to combine the first, second, third and fourth twisted pairs of wires into a transmission signal and output the transmission signal along an Ethernet cable. This system yet further includes an ODU having electronic devices configured to receive the transmission signal via the Ethernet cable, extract the data signal from the transmission signal, amplify the transmission signal, and transmit the extracted data signal to the satellite, wherein the electronic devices are energized using the DC power signal.

The DC power signals across each of the twisted pair of wires preferably has a voltage of at most 59 V, and the power transmission of all of the twisted pair of wires is preferably at most 100 Watts. Most preferably, the power transmission is at most 70 Watts.

The base station can be configured to condition the DC power signal along the Ethernet cable for hot connect and hot disconnect, wherein hot is defined as a live DC power signal. Also, the base station can include circuitry for short circuit protection.

In each of the aforementioned embodiments of the present invention, the ODU can include a controller operatively arranged to control a power supply to the up-converter, wherein the controller shuts off the power supply to the up-converter when the modem is not outputting the baseband signal. This can be performed when the modem determines the up-converter needs to power down to conserve power consumption or minimize heat dissipation.

Additionally, the up-converting device can include a power amplifier having an adjustable gain, and a frequency multiplier configured to convert the baseband signal to a transmission frequency having at least one of an S, C, X, Ku and Ka band of frequency, or a frequency within a range of at least one of 5.65 to 6.85 GHz, 7.9 to 8.4 GHz, 13.75 to 14.50 GHz and 29.5 to 31.0 GHz.

Also, the modem of VSAT preferably outputs the baseband signal as one of quadrature amplitude modulation (QAM), phase-shift keying (PSK), quadrature phase-shift keying (QPSK), 8 phase-shift keying (8-PSK), 16 phase-shift keying (16-PSK), differential phase-shift keying (DPSK), binary phase-shift keying (BPSK), constant envelope modulation, continuous phase modulation (CPM), minimum-shift keying (MSK), orthogonal frequency-division multiplexing (OFDM), and frequency-division multiplexing (FDM).

Further, the up-converting device or power amplifier is preferably configured to amplify the transmission signal up to a power of 8 Watts. The power amplifier can also be configured as a driver to amplify the transmission signal up to a power within a range of 0.25 to 40 Watts.

BRIEF DESCRIPTION OF THE DRAWINGS

The invention is to be explained in more detail below on the basis of exemplary embodiments that are represented in the drawings, in which.

DESCRIPTION OF THE PREFERRED EMBODIMENTS

Figure 1:
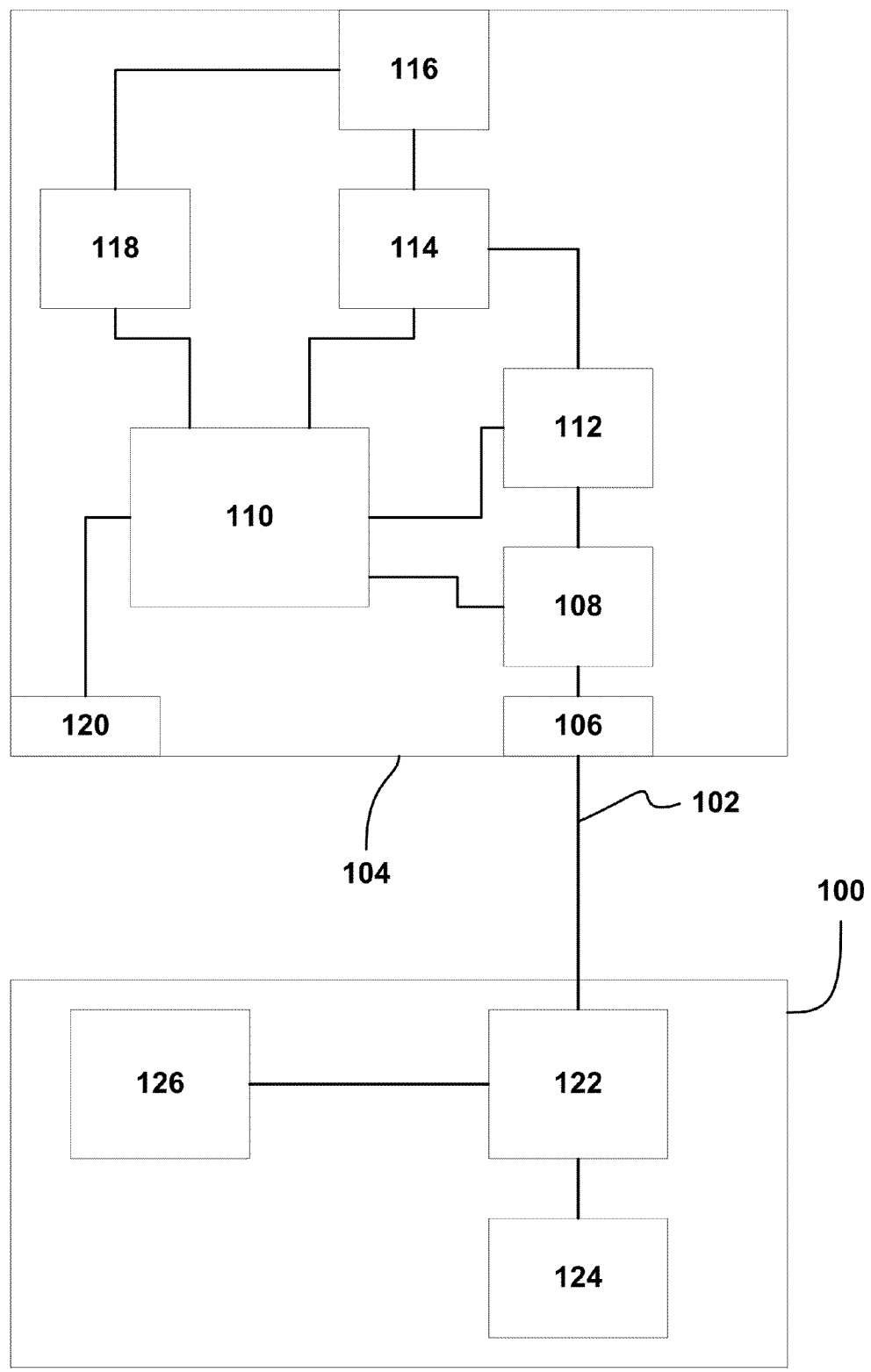
FIG. 1 shows an indoor unit connected to an outdoor unit for a VSAT system.

FIG. 1 depicts a VSAT including an IDU (indoor unit) 100 connected by an IFL (Inter Facility Link) 102 to an ODU (outdoor unit) 104. The ODU 104 preferably includes a connector 106 for accepting the IFL 102 and a de-multiplexer or signal separator 108.

Signal separator 108 separates a data signal and a DC power signal from the IFL 102 and transmits the data signal to the modem 110 and the DC power signal to the power distributor 112. The power distributor 112 supplies DC power to the modem 110 and the up-converter 114. The up-converter 114 is further connected to a waveguide 116 for communicating to a satellite (not shown). The waveguide 116 can also be a feed horn assembly.

The waveguide 116 is also connected to a low noise block converter 118. The low noise block converter 118 can also be a phase lock loop low noise block converter. The low noise block converter 118 is then also connected to the modem 110. The modem 110 then converts the signal received from the low noise block converter 118 to a data signal to be sent to the signal separator 108 for combination and retransmission through the connection 106 and along the transmission line 102 back to the indoor unit 100. The modem 110 may also include a display 120 displaying status of the ODU 104, including power status, network status/connectivity, and transmission status. The display 120 may also display the frequency of the transmission signal.

The indoor unit 100 generally includes a signal combiner 122 connected to an AC or DC power source 124 and a data source 126. The data source 126 can include a network or a personal computer (not shown).

Figure 2:
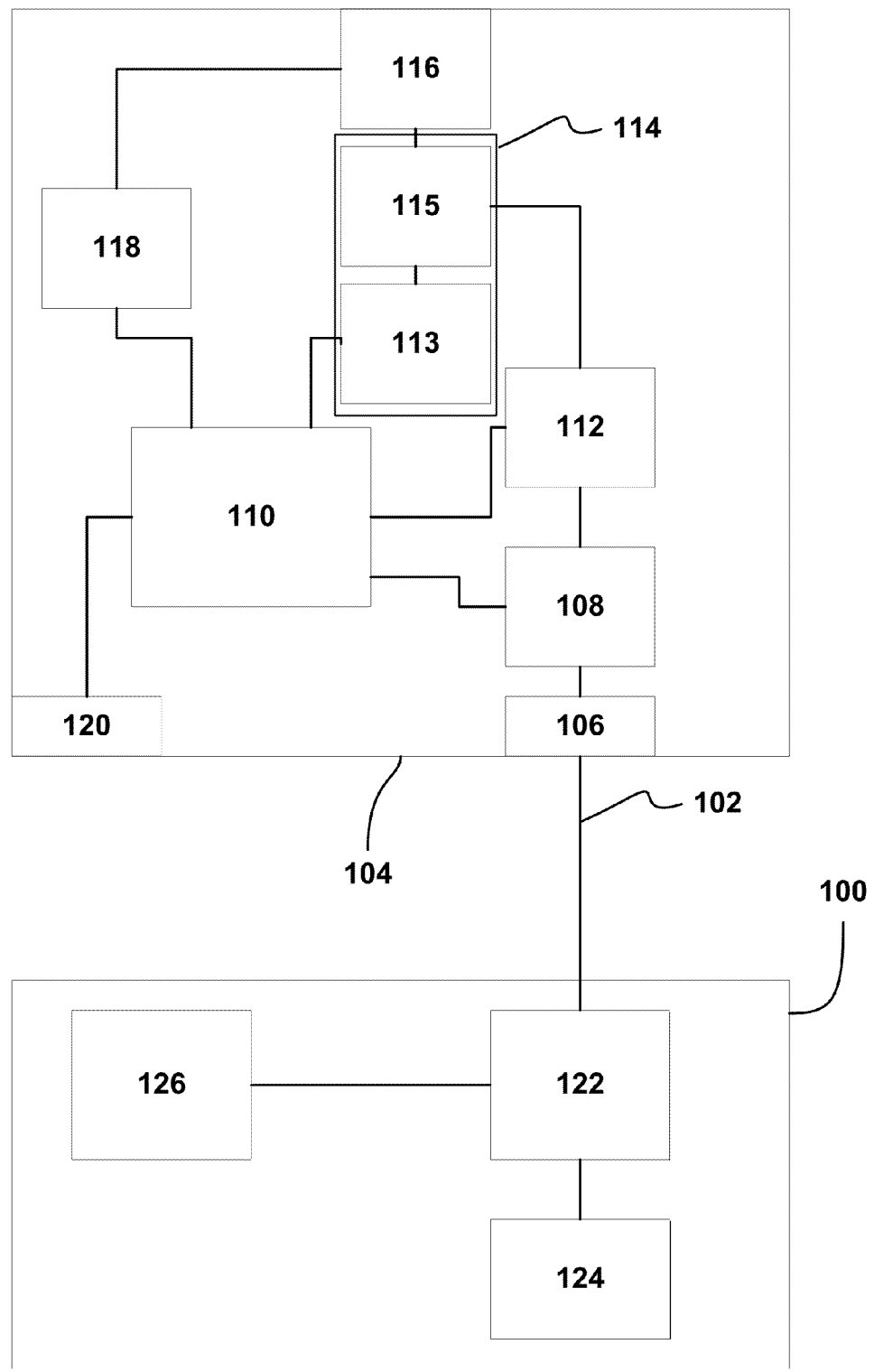
FIG. 2 shows another indoor unit connected to an outdoor unit for a VSAT system.

Referring to FIG. 2, the up-converter 114 may include a frequency multiplier or phase lock loop (PLL) 113 and a power amplifier 115 where the power amplifier 115 is connected the power distributor 112. In the embodiments depicted in FIGS. 1 and 2, the up-converter 114 may be a block up-converter and is preferable arranged to frequency up-convert and amplify the signal received from the modem 110 to a microwave frequency transmission signal. Preferably, the frequency is in the S, C, X, Ku and Ka band of frequency, or even more preferably is a frequency between 13.75 to 14.50 GHz. However, the transmission frequency can be within a range of at least one of 5.65 to 6.85 GHz, 7.9 to 8.4 GHz, 13.75 to 14.50 GHz and 29.5 to 31.0 GHz.

The invention as discussed above and as recited in the claims allows for the IFL 102 to be of any length since the modem 110 and the block up-converter 114 are housed very near each other in the ODU 104, and preferably at a fixed distance from one another. Also, in this configuration it is not necessary for timing information to be sent along the IFL 102.

The ODU 104 may further include a power controller (not shown), configured to modulate a power supply to the up-converter 114 to shut off the power supply when the modem 110 is not transmitting a baseband signal to the up-converter 114. Preferably, the modem is configured to determine whether the up-converter and the amplifier need to power down to conserve power consumption and minimize heat dissipation To power the ODU 104, the signal combiner 122 can be an orthogonal frequency-division multiplexer configured to combine the power signal from DC power source 124 and a data signal from the data source 126 into a bi-direction transmission signal along the IFL 102, where the IFL 102 is a coaxial cable.

In this embodiment, the de-multiplexer 108 is configured to de-multiplex the transmission signal received via the coaxial cable to separate the extracted data signal from the DC power signal. Preferably, the DC power signal has a voltage of at most 59 V and a power transmission of at most 100 Watts. More preferably, power transmission is at most 70 Watts.

The signal combiner 122 is preferably configured to condition the DC power signal along the coaxial cable for hot connect and hot disconnect, wherein hot is defined as a live DC power signal. Also, the signal combiner 122 is preferably configured to include circuitry for short circuit protection.

Alternatively, in yet a further embodiment, the signal combiner 122 can be a bi-directional data interface connected to the data source 126. The signal combiner 122 is configured to transmit a first data signal received along a first twisted pair of wires and receive a second data signal along a second twisted pair of wires, both of which are routed to the data source 126. The twisted pairs of wires may form an Ethernet cable.

This system includes a power sourcing device 124 configured to output a DC power to the signal combiner 122 where a DC power signal is sent along both the first and second twisted pair of wires as well as a third and fourth twisted pair of wires of an Ethernet cable. The signal combiner 122 combines the first, second, third and fourth twisted pairs of wires into a transmission signal and outputs the transmission signal along an Ethernet cable.

The DC power signals across each of the twisted pair of wires preferably has a voltage of at most 59 V, and signal power of signals transmitted along the twisted pairs of wires is preferably at most 70 Watts. More preferably, power transmission is at most 70 Watts.

The signal combiner 122 is preferably configured to condition the DC power signal along the Ethernet cable for hot connect and hot disconnect, wherein hot is defined as a live DC power signal. Also, the signal combiner 122 is preferably configured to include circuitry for short circuit protection.

The ODU 104 is preferably constructed out of a rigid housing structure and is preferably configured to be environmentally resistant to at least solar radiation, water and pollution. Also, the ODU 104 is preferably constructed from a metal or metallic material or a rigid plastic. The ODU 104 may also include a sealing mechanism for protecting the electronic components contained therein from water contact. In a most preferably embodiment, the ODU 104 is waterproof, UV resistant and impact resistant.

The configurations discussed above allow for simpler and more efficient calibration/commissioning of the modem 110 and the up-converting device 114 as discussed below.

During manufacturing of the ODU 104, a maximum power amplification can be determined for a wide range of frequencies because the modem 110 and the up-converter 114 are at a fixed distance and fixedly secured within the ODU 104. The maximum power amplification characteristics can be stored onboard the ODU 104 in a computer readable medium for easy access and retrieval during installation, or alternatively can be set during manufacturing if the operating frequency is already known.

Additionally, the power transmission characteristics of the up-converter 114 across a wide range of gain inputs and potential operating frequencies can be recorded onto the computer readable medium for easy access and retrieval during installation.

Figure 3:
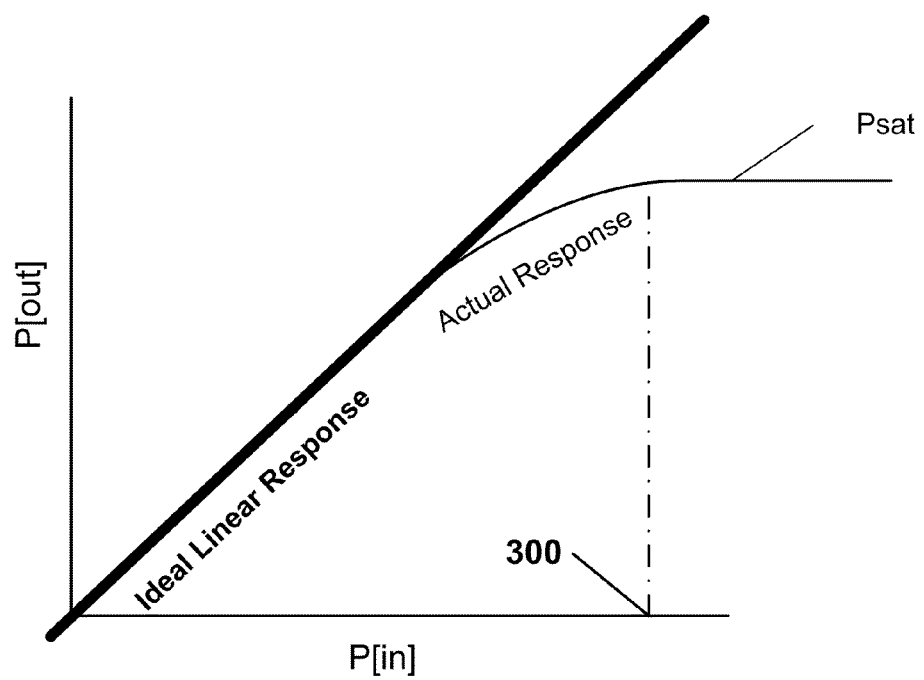
FIG. 3 shows a gain response curve for a power amplifier.

The maximum power amplification of the up-converter 114 is preferably calibrated by means of determining a saturation point of the gain response of the up-converter 114. For example, with reference to FIG. 3, the saturation point corresponds to a gain point at which an increase in the gain input results in no increase to power output, namely above point 300, P[sat]. The saturation point is frequency dependent. Saturation occurs where the 'Actual Response' curve becomes substantially horizontal. The maximum power amplification of the up-converter 114 is preferably set just below this saturation point, namely point 300. This ensures the most efficient use of the power amplification of the up-converter 114 and the strongest signal.

Figure 4:
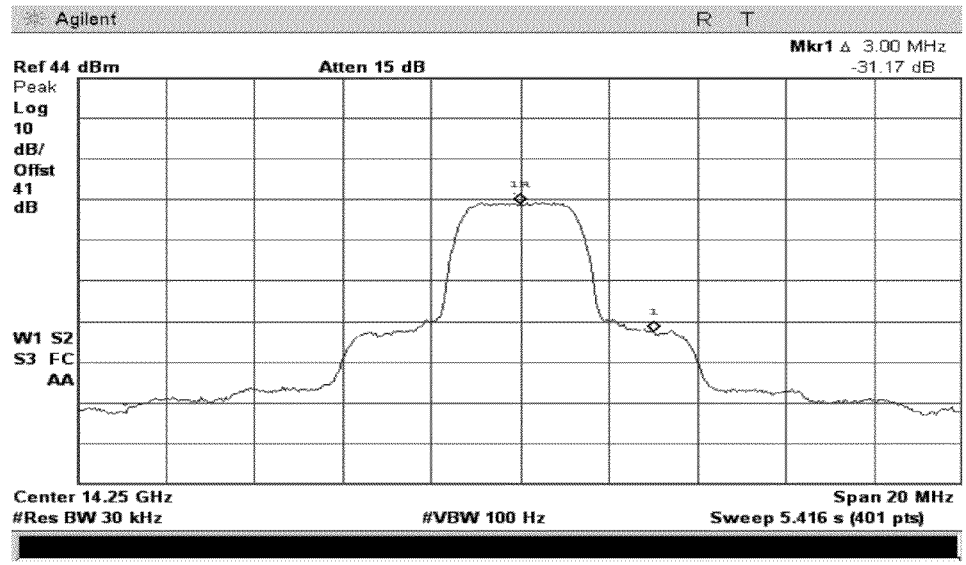
FIG. 4 shows an output power at a gain level just below saturation, +36 dBm, of a block up-converter according to the present invention at power level of 4 W in the Ku-band.
Figure 5:
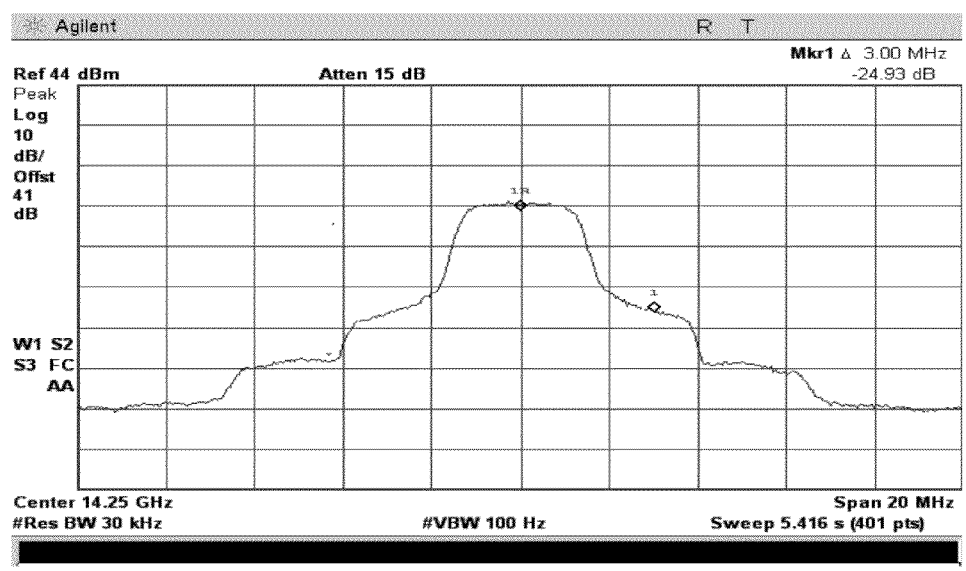
FIG. 5 shows an output power at a gain level at saturation, >+37 dBm, of a block up-converter according to the present invention at power level of 4 W in the Ku-band.

At the saturation point, the transmission signal starts to become degraded, as depicted in FIGS. 4 and 5. FIG. 4 shows an up-converting device operating at the maximum power amplification for a Ku-band transmission at 4 Watts. FIG. 5 shows the same signal, but at the next incremental increase in gain to the up-converter.

The invention as claimed, however, is fully applicable to a wide range of transmission frequencies and transmission power, including any of the S, C, X, Ku and Ka bands of frequency and powers above 8 Watts. Preferably, the transmission signal has a power between 0.25 to 40 Watts.

Prior systems are not able to obtain a maximum power amplification so close to saturation because the test frequency for prior systems is not the operating/transmission frequency, as discussed in the 'Discussion of the Background'.

By testing and recording, at the manufacturing facility, a range of operating frequencies for the power amplification and gain input characteristics (power characterization) of the up-converter 114, the operational characteristics of the up-converter 114 can become well known and pre-defined prior to any knowledge of the installation location of the ODU 104. This calibration information may be stored or made accessible to the VSAT during operation. Thus, the VSAT may use calibration information that exactly corresponds to whatever operating transmission frequency is used by the VSAT, to allow for the most efficient use of the power amplification of the up-converter 114.

Further, it is not necessary to attempt to calibrate the VSAT or IDU using a test frequency that is different than the operating frequency, and which may give inaccurate results.

Figure 6:
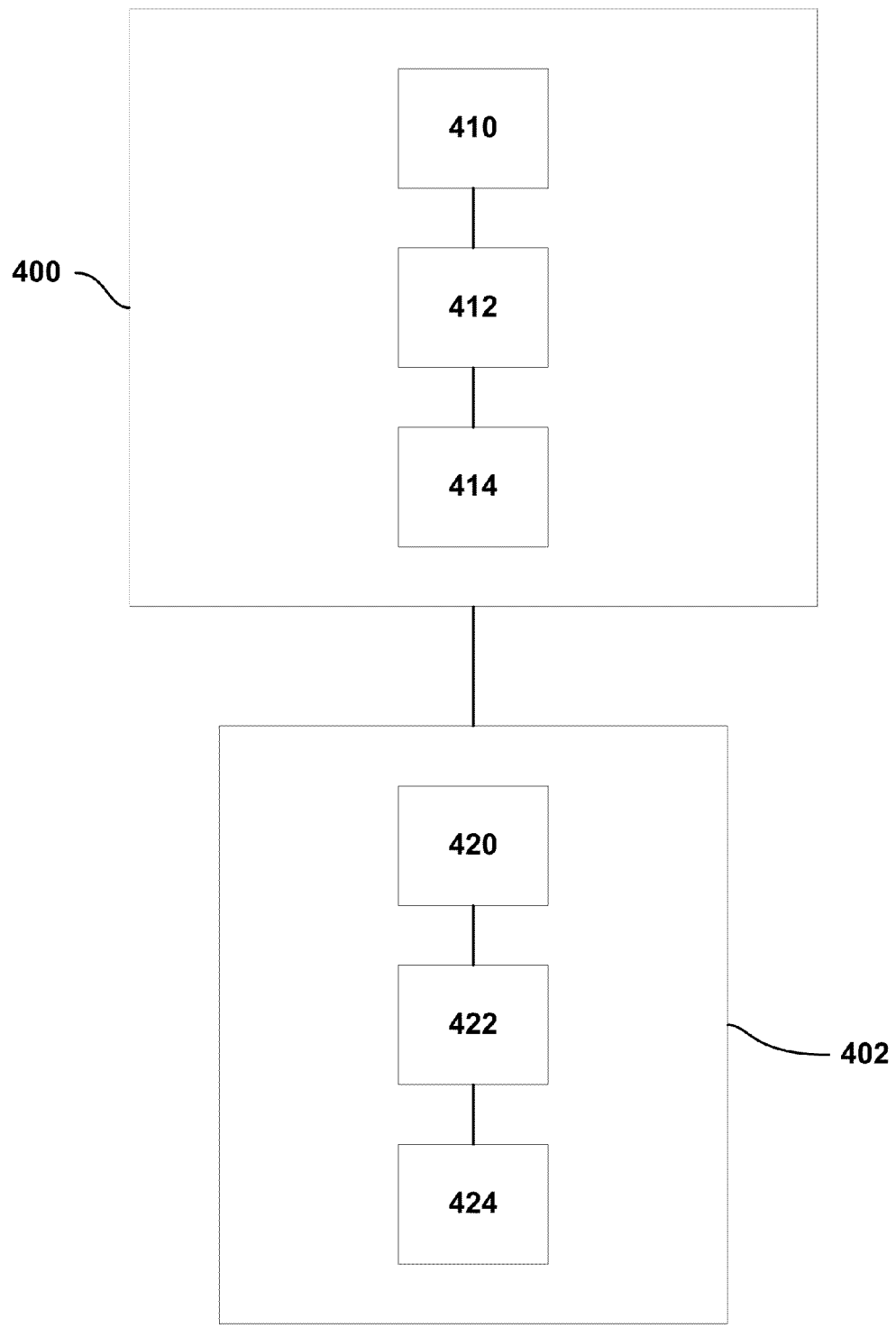
FIG. 6 shows a block diagram depicting a method of commissioning and installing a VSAT system.
Figure 7:
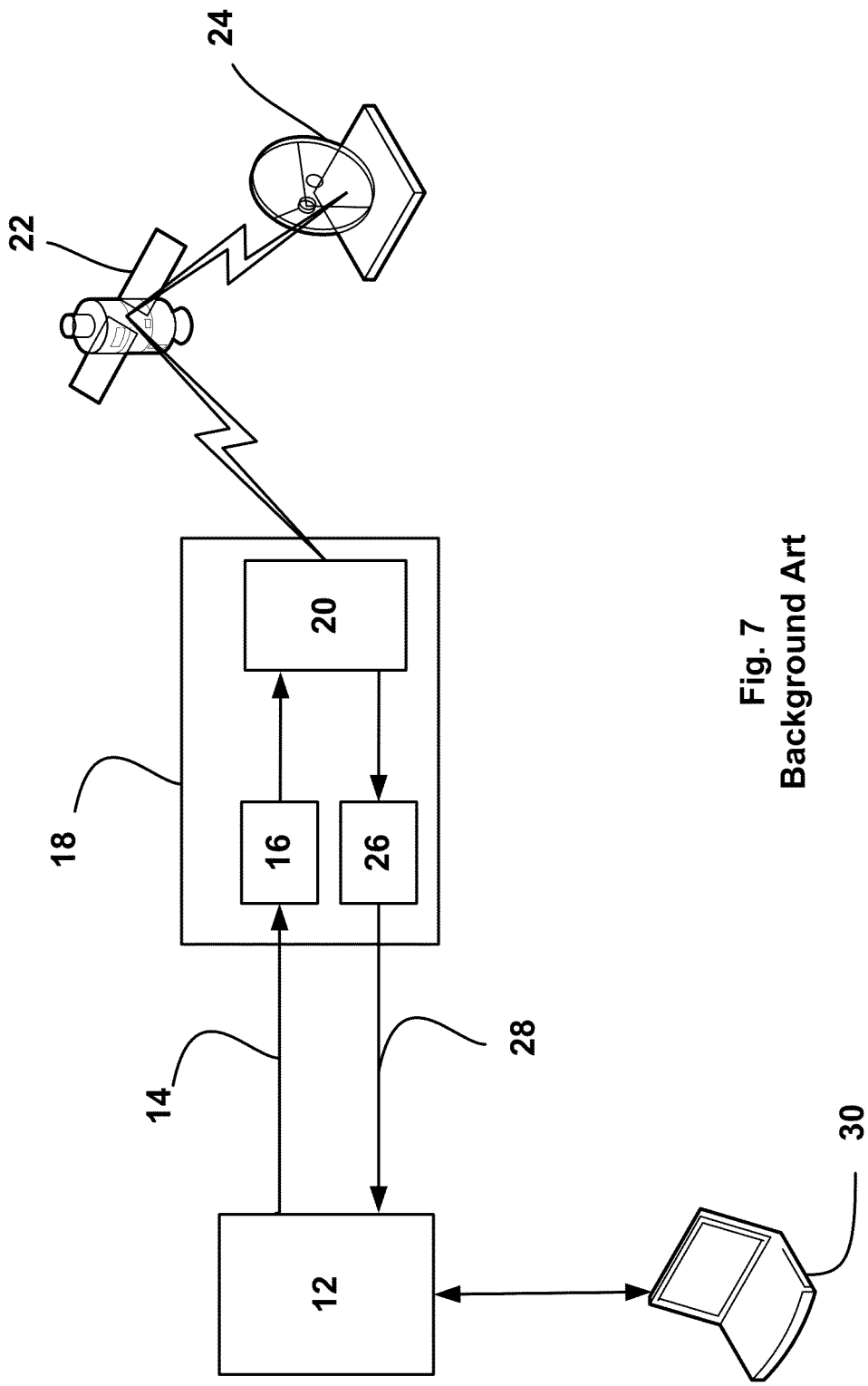
FIG. 7 shows a conventional VSAT system.

With reference to FIG. 6, block 400 denotes steps performed at a manufacturing location whereas block 402 denotes steps performed at a transmission location. The step of determining a maximum value of the adjustable gain of the up-converter 114 occurs at block 410. The step of setting a maximum value of the adjustable gain of the up-converter 114 occurs at block 412, and the step of determining a power characterization of the up-converter 114 for at least the operating frequency of the transmission signal for determining an initial power setting of the up-converter 114 occurs at block 414. The determining steps may be performed irrespective of order, but it is preferred the step of determining the maximum value of the adjustable gain of the up-converter 114 is performed first so as to avoid damaging the up-converter during the power characterization in block 414

After the ODU 104 has been installed at the transmission location, the ODU 104 can then be calibrated for an initial transmission power. The initial power setting is a determination of the optimal level of carrier to noise ratio received at the satellite and the hub. Namely, and for exemplarily purposes only, if the satellite and the receiving hub require a carrier to noise ratio of 0 db for reception of the signal, the initial power setting of the ODU 104 may be set at a power corresponding to a carrier to noise ratio at the satellite or receiving hub of at least 3 db or ideally 6 db so as to avoid any rain fade conditions or other transmission losses at the satellite or ground station. The rain fade condition refers to any environmental condition which the transmission signal will have to penetrate like cloud cover. In operation, if the satellite or the hub were operated under a condition having a carrier to noise ratio of 0 db or less, the VSAT may be disconnected from the preferred network or bandwidth may be reduced.

Since the gain amplification and power transmission characteristics (the power characterization) of the up-converter 114 have already been determined for a wide range of frequencies, an installation technician need only calibrate the ODU 104 using the carrier to noise requirements, environmental losses and the transmission frequency of the transmission signal. Namely, the losses of the ODU 104 at the transmission signal have been predetermined and previously accounted for.

These considerations are commonly referred to as a link budget of a VSAT. The link budget is broadly a function of at least a receiver gain, a receiver loss and a carrier to noise ratio requirement of the satellite, an environmental loss at the operating location, and a transmission loss and a transmission gain of the VSAT.

As a final installation step, the polarization of the transmission signal is calibrated. Specifically, the antenna and reflector are aligned to maximize the receive power at the hub, and to maximize transmit polarization while minimizing cross-polarization interference.

Referring back to FIG. 6, the step of determining and setting the initial power of the transmission signal using the power characterization of the up-converter 114 is identified by blocks 420. The step of calibrating the cross polarization of the transmission signal is identified by blocks 422, and the step of transmitting the transmission signal at the operating frequency to the hub via the satellite is identified by blocks 424.

The invention claimed is:

1. A system for communicating with a satellite, comprising:
    an indoor unit (IDU), including
        a bi-directional data interface configured to transmit a first data signal along a first twisted pair of wires and receive a second data signal along a second twisted pair of wires,
        a power sourcing device configured to output a DC power signal along both the first and second twisted pair of wires as well as a third and fourth twisted pair of wires, and
        a connection interface configured to combine the first, second, third and fourth twisted pairs of wires into a transmission signal and output the transmission signal along an Ethernet cable; and
    an outdoor unit (ODU) including electronic devices configured to receive the transmission signal via the Ethernet cable, extract the data signal from the transmission signal, amplify the transmission signal, and transmit the extracted data signal to the satellite, wherein the electronic devices are energized using the DC power signal.

2. The system of claim 1, wherein the DC power signal across each of the twisted pair of wires has a voltage of at most 59 V, and the power transmission of all of the twisted pair of wires is at most 100 Watts.

3. The system of claim 1, wherein the IDU is configured to condition the DC power signal along the Ethernet cable for hot connect and hot disconnect, wherein hot is defined as a live DC power signal.

4. The system of claim 1, wherein the IDU includes circuitry for short circuit protection.

* * * * *